United States Patent [19]

Imai et al.

[11] Patent Number: 4,849,122

[45] Date of Patent: Jul. 18, 1989

[54] TRANSPARENT ELECTRICAL DISCHARGE MACHINING FLUID

[75] Inventors: Kouji Imai, Ichihara; Isoo Suzuki, Tokyo, both of Japan

[73] Assignee: Idemitsu Kosan Company Limited, Tokyo, Japan

[21] Appl. No.: 97,012

[22] Filed: Sep. 16, 1987

[30] Foreign Application Priority Data

Sep. 16, 1986 [JP] Japan ................................ 61-218720

[51] Int. Cl.$^4$ ............................................ C10M 173/00
[52] U.S. Cl. .................................. 252/73; 219/69.14; 252/49.5; 252/309
[58] Field of Search ........................ 252/49.5, 73, 309; 219/69 D

[56] References Cited

U.S. PATENT DOCUMENTS

| | | | |
|---|---|---|---|
| 2,996,602 | 8/1961 | Webb | 219/69 D |
| 3,117,929 | 1/1964 | McCoy et al. | 252/73 |
| 4,336,147 | 6/1982 | Stayner | 252/49.5 |

FOREIGN PATENT DOCUMENTS

| | | | |
|---|---|---|---|
| 181522 | 10/1983 | Japan | 219/69 D |
| 4623 | 1/1986 | Japan | 219/69 D |

*Primary Examiner*—Robert A. Wax
*Attorney, Agent, or Firm*—Armstrong, Nikaido, Marmelstein, Kubovcik & Murray

[57] ABSTRACT

Disclosed is a transparent electrical discharge machining fluid which is provided by mixing 95-60% by weight of a mineral oil and/or a synthetic oil, 5-40% by weight of water and surface active agent in an amount of 5-40% by weight of said oil and water. This machining fluid is transparent and has a kinetic viscosity of 20 sSt or less at 40° C.

3 Claims, No Drawings

TRANSPARENT ELECTRICAL DISCHARGE MACHINING FLUID

BACKGROUND OF THE INVENTION

This invention relates to a transparent electrical discharge machining fluid and more particularly it relates to a machining fluid which is used for electrical machining called as electrical discharge system such as electrical discharge machining, wire cut electrical discharge machining, etc. and which requires less measures for flame prevention even when it is used in a large amount because of its low flexibility, is superior in characteristics as a machining fluid because of less increase in viscosity and less decrease in specific electric resistance and has superior operability because of excellent transparency.

Hitherto, hydrocarbon oils high in insulation have been used as machining fluid for electrical machining.

However, conventional hydrocarbon oils have the defect of reduction in production efficiency because of decrease in machining speed due to cutting dust-like material produced at machining and carbon liberated from the hydrocarbon oils. There are further problems that when applied voltage is increased because of reduction of specific electric resistance, the machined surface becomes rough and exhaustion of electrode is hastened.

Furthermore, hydrocarbon oils are generally high in flash point and so sufficient preventive measures for flaming must be adopted at use and especially when they are used in a large amount, considerable costs and labors are required for adoption of the measures. As electrical machining fluids free from the problems in the conventional hydrocarbon oils, there have been proposed various machining fluids such as emulsion type electrical machining solutions comprising an oil of high electrical resistance to which water is added. (cf. Japanese Patent Unexamined Publication (kokai) Nos. 6416/80 and 181552/83).

However, when said electrical machining fluids are W/O emulsions, specific electric resistance reaches nearly 0 and discharge machining becomes difficult and when machining is forcibly made, applied voltage must be increased, resulting in further acceleration of shortening of life of electrode due to increase in load applied to the electrode. Furthermore, since they are emulsions, their flash point is low and there are much possibilities of flaming. Besides, they are high in viscosity and removal of cutting dust-like material and carbon particles which get mixed in during machining is difficult. Moreover, in the W/O type emulsion, water is continuous phase and electrical discharge machining is impossible, though electrolytic machining is possible.

SUMMARY OF THE INVENTION

The object of this invention is to provide a transparent electrical discharge machining fluid which is free from the above problems and is high in flash point to make it possible to employ small equipments for prevention of flaming and for extinction, is less in reduction of specific electrical resistance to make it possible to remove the problems such as reduction of machining speed, roughening of machined surface and exhaustion of electrodes and besides is excellent in workability.

This invention has been made under the above circumstances.

As a result of the inventors's extensive researches in an attempt to attain the above object, it has been found that the transparent electrical discharge machining fluid is obtained by adding a surface active agent to a mixture of a mineral oil and/or a synthetic oil and a specific proportion of water. Thus, this invention has been accomplished.

That is, the gist of this invention for accomplishing the above object resides in a transparent electrical discharge machining fluid which is characterized by being transparent and having a kinetic viscosity of 18 cSt or less at 40° C. and being prepared by mixing a mixture comprising 95-60% by weight of at least one oil selected from the group consisting of a mineral oil and a synthetic oil, 5-40% by weight of water and 5-40% by weight (based on said mixture) of a surface active agent to solubilize said water.

DESCRIPTION OF THE INVENTION

Said mineral oil includes, for example, paraffinic oils and naphthenic oils having a kinetic viscosity of 40° C. of 10 cSt or less, preferably 8 cSt or less. These paraffinic oils and naphthenic oils are obtained by refining of petroleum distilate. Furthermore, light oils such as kerosine, gas oil, etc. and general lubricating oils such as spindle oil, machine oil, etc. may also be used alone or in admixture as mineral oils in this invention. Light mineral oils are preferred in this invention.

As said synthetic oils, mention may be made of, for example, hydrocarbon synthetic oils, synthetic ester oils such as dibasic acid esters, silicate esters, phosphate esters, neopentylpolyol esters, etc., synthetic polyglycol oils, synthetic polyphenyl ether oils, synthetic silicone oils, etc. which have a kinetic viscosity of 10 cSt or less, preferably 8 cSt or less at 40° C.

In this invention, said mineral oil and said synthetic oil may be used alone or in combination of two or more.

In any case of using either the mineral oil or the synthetic oil or using them in combination, the mineral oil and/or the synthetic oil desirably have a kinetic viscosity at 40° C. of 10 cSt or less, preferably 8 cSt or less, more preferably 1.5-5 cSt and have a flash point of 80°-160° C. As such mineral oil and synthetic oil, light mineral oils having a kinetic viscosity at 40° C. of 1.6 cSt, 2.1 cSt, 3.5 cSt, 4.5 cSt or the like and α-olefin oligomers having a kinetic viscosity at 40° C. of 2.5 cSt, 3.5 cSt or the like may be commercially easily available.

When kinetic viscosity at 40° C. of said mineral oil and/or synthetic oil is more than 10 cSt, viscosity of the transparent electrical discharge machining fluid of this invention increases and the cutting dust-like material produced during machining do not settle, but remain on the worked surface, resulting in bad effects on the machined surface.

As said water, distilled water which has been fully purified is preferred, but may contain a slight amount of impurities such as tap water as far as it does not hinder attainment of the object of this invention.

It is important that mixing ratio of said mineral oil and/or synthetic oil and water is 95-60%, preferably 93-75% by weight of the mineral oil and/or synthetic oil and 5-40%, preferably 7-25% by weight of water.

When the amount of water is less than 5% by weight, flash point of the transparent electrical discharge machining fluid cannot be raised and when more than 40% by weight, the viscosity of the machining fluid increases to make it impossible to obtain good machined surface.

As said surface active agents, mention may be made of, for example, anionic surface active agents such as carboxylates, e.g., fatty acid and resin acid soaps, N-acylcarboxylates, ether carboxylate, etc., sulfonates, e.g., alkylsulfonates, sulfosuccinates, ester sulfonates, alkylaryl and alkylnaphthalenesulfonates, etc., sulfate ester salts, e.g., sulfated oils, ester sulfates, alkylsulfates, ethersulfates, alkylarylether sulfates, amidosulfates, etc. and phosphates, e.g., alkylphosphates, etherphosphates, alkylaryletherphosphates, amidophosphates, formalin condensation sulfonates; cationic surface active agents such as aliphatic amine salts and quaternary ammonium salts thereof, e.g., primary amine salts, secondary amine salts, tertiary amine salts, quaternary amine salts, quaternary ammonium salts, hydroxyammonium salts, etherammonium salts, etc., aromatic quaternary ammonium salts, e.g., benzalkonium salts, benzethonium salts, etc., pyridinium salts, imidazolonium salts, etc., betaines such as carboxybetaines, sulfobetaines, etc.; emphoteric surface active agents such as aminocarboxylates, imidazoline derivatives, etc.; nonionic surface active agents such as ethers, e.g., alkyl and alkylarylpolyoxyethylene ethers, alkylaryl formaldehyde condensation polyoxyethelene ethers, glycerine ether and its polyoxyethylene ethers, block polymers having a polyoxypropylene as lipophilic group, alkylthiopolyoxyethylene ethers, etc., ether esters, e.g., polyoxyethylene ethers of propyleneglycol esters, polyoxyethylene ethers of glycerine esters, polyoxyethylene ethers of sorbitan esters, esters of sorbitolpolyoxyethelene ethers, esters of glycerine ether, esters of alkylpolyoxyethylene ethers, polyoxyethylene ether esters of copolymers, etc., esters, e.g., polyoxyethylene fatty acid esters, glycerine esters, sorbitan esters, dihydric alcohol esters, sucrose esters, etc. and nitrogen containing type surface active agents, e.g., fatty acid alkanol amides, polyoxyethylene fatty acid amides, esters of alkanol amines, polyoxyethylenealkylamines, amine oxides, etc.; fluorine surface active agents; polypeptide derivatives; natural surface active agents, etc.

Said surface active agents may be used alone or in combination of two or more. In this invention it is preferred for reduction of the amount of surface active agents to use them as a mixture of two or more.

When two or more surface active agents are used in combination, preferred is use of nonionic surface active agent and anionic surface active agent in combination. In this case, preferred nonionic surface active agents are polyoxyethylenenonylphenyl ether, polyoxyethyleneoctylphenyl ether, polyoxyethylenesorbitan monooleate, etc. and preferred anionic surface active agents are sodium dialkylsulfosuccinates, sodium alkylnaphthalenesulfonates, alkanol amine salts of fatty acids, etc.

In this invention, it is to be noted that the electrical discharge machining fluid is transparent fluid prepared by adding, to a mixture of said mineral oil and/or said synthetic oil and said water, said surface active agent in an amount of 5–40% by weight of said mixture to solubilize water in said mineral oil and/or said synthetic oil and this transparent fluid has a kinetic viscosity of 20 cSt or less.

When the amount of said surface active agent is less than 5% by weight of said mixture, said mixture is not solubilized and this is not desirable for attaining the object of this invention. When more than 40% by weight, the kinetic viscosity of the solubilized fluid becomes too high and this is not desired.

When viscosity of the transparent electrical discharge machining fluid is higher than 20 cSt, cutting dust-like material remain on the worked surface and good worked surface cannot be obtained and besides working speed decreases and so productive efficiency is also reduced.

The transparent electrical discharge machining fluid of this invention may further contain antioxidants and rust proofing agents in addition to said mineral oil and/or synthetic oil, water and surface active agent as far as attainment of the object of this invention is not hindered.

Thus obtained transparent electrical discharge machining solution is reusable by removing cutting dust-like material in the fluid, for example, by a filter.

This invention has the following advantage and benefit.

(1) A transparent electrical discharge machining fluid having markedly higher flash point than the conventional transparent electrical discharge machining fluid can be provided. That is, this transparent electrical discharge machining solution does not readily flame and so does not require flame preventing equipment and extinction equipment of large scale and can be used safely in a large amount with simple flame preventing equipment and extinction equipment.

(2) Reduction of specific electrical resistance is prevented by addition of surface active agents and as a result machining can be performed without increasing applied voltage. Therefore, there is provided a transparent electrical discharge machining fluid which does not cause roughening of the machined surface and does not hasten exhaustion of electrode.

(3) Increase of viscosity caused by the use of water can be controlled by the addition of surface active agents. Therefore, the cutting dust-like material produced during machining do not remain on the worked surface and thus good worked surface can be obtained.

(4) The fluid is not milky like emulsion type machining fluid and is excellent in transparency. Therefore, machining state can be visually observed to provide superior operability.

This invention will be further illustrated by the following examples and comparative examples.

EXAMPLES 1–4 AND 6 AND COMPARATIVE EXAMPLES 1 AND 2

A base oil (a light mineral oil having a kinetic viscosity of 2.1 cSt at 40° C.) and water were mixed at the ratios as shown in Table 1. To the mixture was added a 4:1 mixture of a nonionic surface active agent (polyoxyethylene nonylphenyl ether) and an anionic surface active agent (sodium alkylnaphthalenesulfonate) in an amount of 25% by weight of said mixture of the base oil and water, followed by vigorously stirring. Thus obtained transparent electrical discharge machining fluids were measured on specific gravity (according to JIS K-2249), kinetic viscosity (according to JIS K-2283), flash point (Cleveland open-cup method, JIS K-2265) and refractive index (according to JIS C-2101). The results are shown in Table 1.

As shown in Table 1, when proportion of water in the transparent electrical discharge machining fluid is too high, the effect of this invention cannot be exhibited. Further, flash point of the machining fluids of this invention could not be detected by the Cleveland open-cup method and they had very high flash points and were transparent.

TABLE 1

|  | Comparative Example 1 | Example 1 | Example 2 | Example 3 | Example 4 | Example 6 | Comparative Example 2 |
|---|---|---|---|---|---|---|---|
| Water (wt %) | 0 | 5 | 10 | 15 | 20 | 15 | 50 |
| Specific Gravity (15/4° C.) | 0.8907 | 0.9053 | 0.9111 | 0.9159 | 0.9202 | 0.900 | 0.9450 |
| Kinetic Viscosity (cSt 40° C.) | 5.733 | 9.395 | 11.64 | 13.43 | 15.06 | 6.0 | 28.3 |
| Flash Point (°C.) | 110 | — | — | — | — | — | — |
| Refractive Index ($N^{20}d$) | 1.4730 | 1.4699 | 1.4640 | 1.4582 | 1.4517 | 1.4416 | —* |
| Specific Electric Resistance (kΩ · cm) | ≧20 | ≧20 | ≧20 | ≧20 | ≧20 | ≧20 | ≧20 |
| Surface Roughness (μm) | — | 8 | 10 | 12 | 14 | 7 | 28 |

*Meassurement was impossible because of opaque.
$N^{20}d$; Refractive index at 20° C.

EXAMPLE 5 AND COMPARATIVE EXAMPLES 3 AND 4

To a mixture prepared by mixing the mineral oil having a viscosity as shown in Table 2 and water at the mixing ratio as shown in Table 2 was added the surface active agent as shown in Table 2 in an amount as shown in Table 2 to obtain transparent electrical discharge machining fluids. Kinetic viscosity and flash point of these machining fluids were measured in the same manner as in the above examples. Further, the fluids were subjected to discharge machining test (A steel of S50C was subjected to discharge machining by discharge machining apparatus "MAKINO EDNC-64A8" provided with graphite electrodes and roughness of the machined surface was shown by μm.). The results are shown in Table 2.

As shown in Table 2, when kinetic viscosity exceeded 40 cSt (40° C.) (cf. Comparative Example 4), the surface roughness of the machined article increased due to the high viscosity and this is undesirable. Further, addition amount of surface active agent exceeded 40% (Comparative Example 5), the similar phenomenon occurred and surface roughness of the machined article increased.

On the other hand, when oil base, water and surface active agent were mixed at a specific ratio as in this invention, the transparent discharge machining fluid which exhibited the effects of this invention was obtained.

TABLE 2

|  | Comparative Example 4 | Comparative Example 5 | Example 5 |
|---|---|---|---|
| Kind of Base Oil | Mineral Oil | Mineral Oil | Synthetic Oil |
| Kinetic Viscosity of Base Oil (cSt at 40° C.) | 11 | 2.1 | 2.5 |
| Amount of Water (%) | 20 | 20 | 20 |
| Kind of Surfase Active Agent | Nonionic and Anionic | Nonionic and Anionic | Nonionic |
| Amount of Surfase Active agent (%) | 25 | 50 | 30 |
| Flash Point (°C.) | Unmeasurable | Unmeasurable | Unmeasurable |
| Refractive Index ($N^{20}d$) | 1.4615 | 1.4630 | 1.4618 |
| Kinetic Viscosity of Machining (cst) | 46.2 | 29.5 | 19 |
| Specific Electric Resistance (kΩcm) | ≧20 | ≧20 | ≧20 |
| Surfase Roughness (μm) | 42 | 30 | 15 |

What is claimed is:

1. A transparent electrical discharge machining fluid having a kinetic viscosity of 20 cSt or less at 40° C., and consisting essentially of a mixture of 95–60% by weight of at least one oil selected from the group consisting of a mineral oil and a synthetic oil, said at least one oil having a kinetic viscosity of 1.5–5 cSt; 5–40% by weight of water; and 5–40% by weight, based on the mixture of said at least one oil and water, of a mixture of a nonionic surface active agent and an anionic surface active agent.

2. A machining fluid according to claim 1 wherein said mineral oil is a light mineral oil.

3. A machining fluid according to claim 1 wherein said surface active agent is combination of polyoxyethylene nonylphenyl ether and sodium alkylnaphthalenesulfonate.

* * * * *